US008437418B2

(12) United States Patent
Li et al.

(10) Patent No.: US 8,437,418 B2
(45) Date of Patent: May 7, 2013

(54) METHOD AND APPARATUS FOR DETECTING SIGNALS OF MULTI-INPUT MULTI-OUTPUT SYSTEM

(75) Inventors: Bin Li, Shenzhen (CN); Yi Luo, Shenzhen (CN); Jinho Choi, Swansea (GB); Nguyen Huan, Glasgow (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

(21) Appl. No.: 12/793,890

(22) Filed: Jun. 4, 2010

(65) Prior Publication Data

US 2010/0239043 A1 Sep. 23, 2010

Related U.S. Application Data

(63) Continuation of application No. PCT/CN2009/071591, filed on Apr. 30, 2009.

(30) Foreign Application Priority Data

Apr. 30, 2008 (CN) .......................... 2008 1 0088724

(51) Int. Cl.
*H04B 7/02* (2006.01)
(52) U.S. Cl.
USPC .............................. 375/267; 375/260; 375/259
(58) Field of Classification Search ............... 375/267
See application file for complete search history.

(56) References Cited

U.S. PATENT DOCUMENTS

| 2007/0010957 A1* | 1/2007 | Sampath et al. ............... 702/57 |
| 2007/0086549 A1 | 4/2007 | Kim et al. |
| 2007/0230628 A1* | 10/2007 | You et al. ...................... 375/340 |
| 2008/0049863 A1 | 2/2008 | Heiskala |
| 2008/0137762 A1* | 6/2008 | Waters et al. ................. 375/260 |
| 2009/0196379 A1* | 8/2009 | Gan et al. ...................... 375/340 |

FOREIGN PATENT DOCUMENTS

| CN | 1633051 A | 6/2005 |
| CN | 1705242 A | 12/2005 |
| CN | 101034928 A | 9/2007 |
| CN | 1011034928 A | 9/2007 |
| EP | 1755234 A2 | 2/2007 |
| KR | 10-2008-0021323 | 3/2008 |

(Continued)

OTHER PUBLICATIONS

Lenstra, A. et al., "Factoring Polynomials with Rational Coefficients," Math Ann. 261, 515-534 (1982).

(Continued)

*Primary Examiner* — Kenneth Lam
*Assistant Examiner* — Michael Neff
(74) *Attorney, Agent, or Firm* — Brinks Hofer Gilson & Lione

(57) ABSTRACT

The embodiments of the present invention disclose a method and an apparatus for detecting signals of a MIMO system, and relate to a MIMO technology. The method includes: performing triangular decomposition on a channel matrix of the MIMO system, and decomposing the MIMO system into multiple MIMO subsystems; detecting the receiving signal vector of the first MIMO subsystem, and obtaining the candidate detection vector list of the first MIMO subsystem; detecting remaining MIMO subsystems consecutively in a SIC mode, and generating candidate detection vector lists of the remaining MIMO subsystems; and combining all the lists, and marking decision or performing calculation to obtain the transmitting signal vector of the MIMO system.

15 Claims, 6 Drawing Sheets

FOREIGN PATENT DOCUMENTS

| WO | WO 2007/093907 A2 | 8/2007 |
|---|---|---|
| WO | WO2008/012807 A2 | 1/2008 |
| WO | WO2008026036 A2 | 3/2008 |

OTHER PUBLICATIONS

Extended European Search Report dated (mailed) Mar. 15, 2011, issued in related Application No. 09737707.1-1237, PCT/CN2009071591, Hauwei Technologies Co., Ltd.

Zhang, H. et al., "On Low Complexity ML Detection Algorithm in MIMO System," IEEE (2005).

Wubben, D. et al., "Near-Maximum-Likelihood Detection of MIMO Systems using MMSE-Based Lattice-Reduction," University of Bremen, Germany.

Written Opinion of the International Searching Authority dated (mailed) Aug. 6, 2009, issued in related Application PCT/CN2009071591, Hauwei Technologies Co., Ltd.

International Search Report from P.R. China in International Application No. PCT/CN2009/071591 mailed Aug. 6, 2009.

Chinese Patent No. 101572561, issued on Sep. 5, 2012, granted in corresponding Chinese Patent Application No. 200810088724.0.

\* cited by examiner

METHOD AND APPARATUS FOR DETECTING SIGNALS OF MULTI-INPUT MULTI-OUTPUT SYSTEM

CROSS-REFERENCE TO RELATED APPLICATIONS

This application is a continuation of International Application No. PCT/CN2009/071591, filed on 30 Apr. 2009, which claims priority to Chinese Patent Application No. 200810088724.0, filed on 30 Apr. 2008, both of which are hereby incorporated by reference in their entireties.

FIELD OF THE INVENTION

The present invention relates to a Multi-Input Multi-Output (MIMO) transmission technology, and in particular, to a method and an apparatus for detecting signals of a MIMO system.

BACKGROUND OF THE INVENTION

In a radio communication system, the capacity of the channel increases with the increase of antennas. In order to obtain system capacity higher than the capacity of a single-antenna system, multiple antennas are set on the transmitter side and the receiver side of the MIMO transmission system, which improves the spectrum efficiency of the radio link and the reliability of the link. The channels in a multi-antenna system are called MIMO channels.

Generally, with more antennas and higher order of the modulation symbol, the MIMO receiver is more complex. Based on a Maximum-Likelihood (ML) detection algorithm, the complexity of calculation increases exponentially with the increase of transmitting antennas. In recent years, various methods are designed to reduce the complexity of the receiver, for example, Successive Interference Cancellation (SIC), feedback decision, Maximum A Posterior (MAP), and Sphere Detection (SD) algorithm. Generally, the ML detection algorithm may be simplified as an SD algorithm. The SD algorithm reduces complexity of the receiver on the basis of the ML detection algorithm. However, involving the need of searching out a solution closest to the transmitting vector, the SD algorithm is still rather complicated. In recent years, a Lattice-Reduction (LR) algorithm is put forward to further simplify the ML algorithm. The LR algorithm transforms the existing channel matrix to obtain an equivalent channel matrix. The equivalent channel matrix is similar to a diagonal matrix, and can detect LR domain signals through linear detection or SIC detection, and then map the LR domain signals to transmitting signals, which accomplishes better detection performance and simplifies the receiver drastically. Research reveals that the LR algorithm can obtain full diversity gain.

After analyzing the prior art, the inventor of the present invention finds that: The complexity of the LR algorithm in the prior art increases rapidly with the increase of its basis vectors. Therefore, in a large MIMO system, the detection based on an LR algorithm is still rather complicated, and is difficult to implement.

SUMMARY OF THE INVENTION

The embodiments of the present invention provide a method and an apparatus for detecting signals of a MIMO system. The technical solution under the present invention is as follows:

A MIMO system signal detection method provided in an embodiment of the present invention includes:
performing triangular decomposition on a channel matrix of a MIMO system, and decomposing the MIMO system into multiple MIMO subsystems;
detecting a receiving signal vector of a first MIMO subsystem among the multiple MIMO subsystems, and generating a candidate detection vector list of the first MIMO subsystem according to a detection result;
detecting remaining MIMO subsystems consecutively in a SIC mode, and generating candidate detection vector lists of the remaining MIMO subsystems; and
combining corresponding members of the obtained candidate detection vector lists of all MIMO subsystems to obtain a candidate detection vector list of the MIMO system; and
making decision for or performing calculation on the candidate detection vector list of the MIMO system to obtain a transmitting signal vector of the MIMO system.

A MIMO system signal detection apparatus provided in an embodiment of the present invention includes:
a decomposing module, configured to perform triangular decomposition on a channel matrix of a MIMO system, and decompose the MIMO system into multiple MIMO subsystems;
a detecting module, configured to detect a receiving signal vector of a first MIMO subsystem among the multiple MIMO subsystems;
an initial list generating module, configured to generate a candidate detection vector list of the first MIMO subsystem according to a detection result of the detecting module;
a remaining list generating module, configured to detect remaining MIMO subsystems consecutively in a SIC mode, and generate candidate detection vector lists of the remaining MIMO subsystems; and
a combining and processing module, configured to combine corresponding members of the obtained candidate detection vector lists of all MIMO subsystems to obtain a candidate detection vector list of the MIMO system; and make decision for or perform calculation on the candidate detection vector list of the MIMO system to obtain a transmitting signal vector of the MIMO system.

In the embodiments of the present invention, a MIMO system is divided into multiple MIMO subsystems, and detection is performed in the SIC mode. Because a MIMO subsystem has few basis vectors, Lenstra-Lenstra-Lovasz-Reduction (LLL-Reduction) calculation is not complex, and the LR algorithm is simplified drastically. Through the candidate detection vector lists, the probability of propagation errors is reduced if the LR algorithm performs SIC detection. The MIMO system detection is simplified drastically if the system performance approaches the ML algorithm.

BRIEF DESCRIPTION OF THE DRAWINGS

The following outlines the accompanying drawings for illustrating the embodiments of the present invention or the prior art. Apparently, the accompanying drawings outlined below are for the exemplary purpose only, and persons of ordinary skill in the art can derive other drawings from such accompanying drawings without creative effort.

DETAILED DESCRIPTION OF THE EMBODIMENTS

The following detailed description is directed to the technical solution of the present invention with reference to the accompanying drawings. However, the embodiments to be described are only a part of, rather than all of, the embodiments of the present invention. Additionally, all other embodiments, which can be derived by those skilled in the art from the embodiments given herein without any creative efforts, fall within the scope of the present invention.

Figure 1:
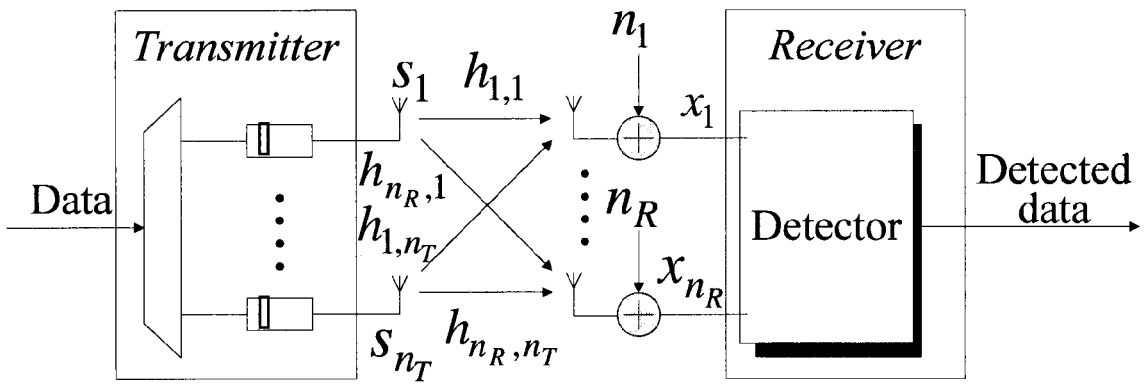
FIG. 1 shows a MIMO system model provided in an embodiment of the present invention.

FIG. 1 shows a MIMO system model provided in an embodiment of the present invention. The MIMO system model implements an ML receiver by using an LR algorithm based on Minimum Mean Square Error (MMSE). In FIG. 1, $n_T$ is the number of transmitting antennas, $n_R$ is the number of receiving antennas, s is an $n_T \times 1$ dimensional complex-valued transmitting vector, x is an $n_R \times 1$ dimensional complex-valued receiving vector. The relation between the receiving vector and the transmitting vector is as follows:

$$x = Hs + n \quad (1)$$

In the foregoing formula, H is an $n_R \times n_T$ dimensional channel matrix, and n represents Gaussian noise vectors whose variance is $\sigma_n^2$ on $n_R$ receiving antennas. Meanwhile, the mean values are $E\{ss^H\}=I_{n_T}$ and $E\{nn^H\}=\sigma_n^2 I_{n_R}$, where I is an identity matrix.

An LR algorithm based on a real-number LLL-Reduction algorithm is described below. The LR algorithm involves much matrix operation. Because a complex matrix is difficult to implement in the matrix operation such as Quadrature Rectangular (QR) decomposition, a complex matrix may be converted into a real-number matrix to facilitate matrix operation such as orthogonalization and diagonalization. Therefore, the complex matrix equation (1) may be converted into the following real-number matrix equation:

$$x_R = H_R s_R + n_R \quad (2)$$

where $$H_R = \begin{bmatrix} \mathcal{R}\{H\} & -I\{H\} \\ I\{H\} & \mathcal{R}\{H\} \end{bmatrix},$$

$$x_R = \begin{bmatrix} \mathcal{R}\{x\} \\ I\{x\} \end{bmatrix},$$

-continued $$s_R = \begin{bmatrix} \mathcal{R}\{s\} \\ I\{s\} \end{bmatrix}, \text{ and}$$

$$n_R = \begin{bmatrix} \mathcal{R}\{n\} \\ I\{n\} \end{bmatrix}.$$

Because $x_R = H_R TT^{-1} s_R + n_R = \tilde{H}z + n_R$, where T is a unimodular matrix and its elements are all integers ($\det(T) = \pm 1$), the matrix is called a reduction unimodular matrix. $\tilde{H}$ is called a lattice-based reduction channel matrix. If the length of the basis vectors that form the $\tilde{H} = H_R T$ is the minimum or close to the orthogonal basis, the issue of MIMO receiving changes from a process of solving s to a process of solving z through a linear receiving algorithm, thus reducing the complexity of the receiver. Generally, reduction calculation can be performed through an LLL-Reduction algorithm to obtain a lattice-based reduction channel matrix $\tilde{H}$. There are many algorithms for solving z, for example, zero-forcing, MMSE algorithm, SIC-based zero-forcing algorithm, and SIC-based MMSE algorithm. The MMSE algorithm is as follows:

$$\tilde{z}_{LR\text{-}MMSE} = (\tilde{H}^T \tilde{H} + \sigma_n^2 TT^{-1})^{-1} \tilde{H}^T x \quad (3)$$

Therefore, an estimate value of the receiving vector may be obtained:

$$\tilde{s}_R = T\tilde{z}_{LR\text{-}MMSE} \quad (4)$$

A list in an embodiment of the present invention may refer to a data storage unit. The list may be implemented through software, for example, data is stored in a memory in the form of a linked list or stack; or, the list may be implemented through hardware, for example, data is stored in a storage or register.

Figure 2:
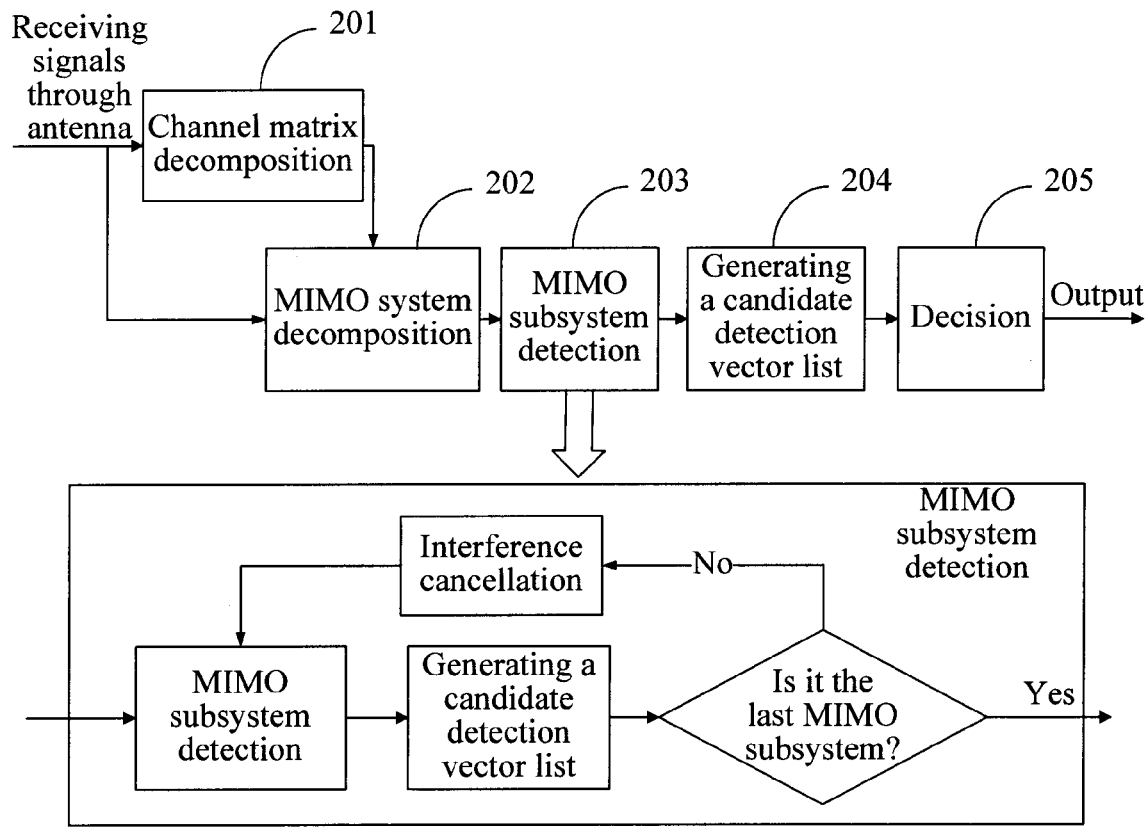
FIG. 2 is a flowchart of a MIMO system signal detection method provided in an embodiment of the present invention.

As shown in FIG. 2, a MIMO system signal detection method provided in an embodiment of the present invention includes the following steps:

201: Perform triangular decomposition on the channel matrix of the MIMO system.

202: Decompose the MIMO system into multiple MIMO subsystems according to the result of the triangular decomposition.

If the result of the triangular decomposition is an upper triangular matrix, the first MIMO subsystem in the multiple MIMO subsystems is a bottom-layer MIMO subsystem; if the result of the triangular decomposition is a lower triangular matrix, the first MIMO subsystem in the multiple MIMO subsystems is a top-layer MIMO subsystem.

203: Detect the receiving signal vector of the first MIMO subsystem among the multiple MIMO subsystems, and generate a candidate detection vector list of the first MIMO subsystem according to the result of detection. Starting from the second MIMO subsystem, detect remaining MIMO subsystems in a SIC mode and generate the candidate detection vector lists of the remaining MIMO subsystems.

The remaining MIMO subsystems may be detected in this way: Starting from the second MIMO subsystem, detect the remaining MIMO subsystems consecutively in a SIC mode; in the receiving signal vectors of the currently detected MIMO subsystem, cancel the interference on the currently detected MIMO subsystem by using each candidate detection vector in the candidate detection vector lists of all detected MIMO subsystems; detect the results of interference cancellation respectively to obtain the candidate detection vector list of the currently detected MIMO subsystem, repeat the process of detecting, canceling and detecting results until the candidate detection vector list of the last MIMO subsystem is obtained.

204: Combine the corresponding members of the candidate detection vector list of all obtained MIMO subsystems to obtain a candidate detection vector list of the MIMO system.

The meaning of "corresponding members" is: A random member in the candidate detection vector list of the currently detected MIMO subsystem corresponds to a member in the candidate detection vector list of the previous MIMO subsystem used for canceling interference at the time of detecting the random member. For example, through QR decomposition, a 6×6 MIMO system may be divided into three 2×2 MIMO subsystems. As shown in Table 1, the first MIMO subsystem is a bottom-layer MIMO subsystem, whose candidate detection vector list is Q1 inclusive of 3 members [Q11, Q12, Q13]; the second MIMO subsystem is an intermediate MIMO subsystem, whose candidate detection vector list is Q2 inclusive of 7 members [Q21, Q22, Q23, Q24, Q25, Q26, Q27], where Q21 and Q22 are results obtained after interference cancellation detection is performed through the member Q11 in the candidate detection vector list Q1; Q23, Q24, and Q25 are results obtained after interference cancellation detection is performed through a member Q12 in the candidate detection vector list Q1, and so on. Therefore, Q11 corresponds to Q21, Q11 also corresponds to Q22, Q12 corresponds to Q23, Q24, and Q25 respectively, and Q13 corresponds to Q26 and Q27 respectively. The third MIMO subsystem is a top-layer MIMO subsystem, and its candidate detection vector list is Q3 which includes 14 members, ranging from Q31 to Q44, where Q31 and Q32 are results obtained after interference cancellation detection is performed through the member Q21 in the candidate detection vector list Q2; Q39 and Q40 are results obtained after interference cancellation detection is performed through the member Q25 in the candidate detection vector list Q2. Therefore, Q21 corresponds to Q31 and Q32 respectively, Q25 corresponds to Q39 and Q40 respectively, and so on. Correspondingly, Q11, Q21, and Q32 may combine into a candidate detection vector list of the before-decomposition MIMO system; or, Q13, Q26, and Q42 may combine into a candidate detection vector list of the before-decomposition MIMO system, and so on.

MIMO system detection complexity is still simplified drastically if the system performance approaches the ML algorithm.

Taking the following MIMO system as an example, the method is detailed below. The receiving signal vector of the MIMO system is:

$$r = Hs + n \qquad (5)$$

In the foregoing formula, H is an N×K channel matrix, s is a K×1 transmitting channel vector, n is N×1 noise vector, and $E\{nn^H\} = N_0 I$; the elements in s satisfies $s_k \in \bar{s}$, where $\bar{s}$ is a set of transmitting signal symbols, and the cardinality of the $\bar{s}$ set is M.

Figure 4:
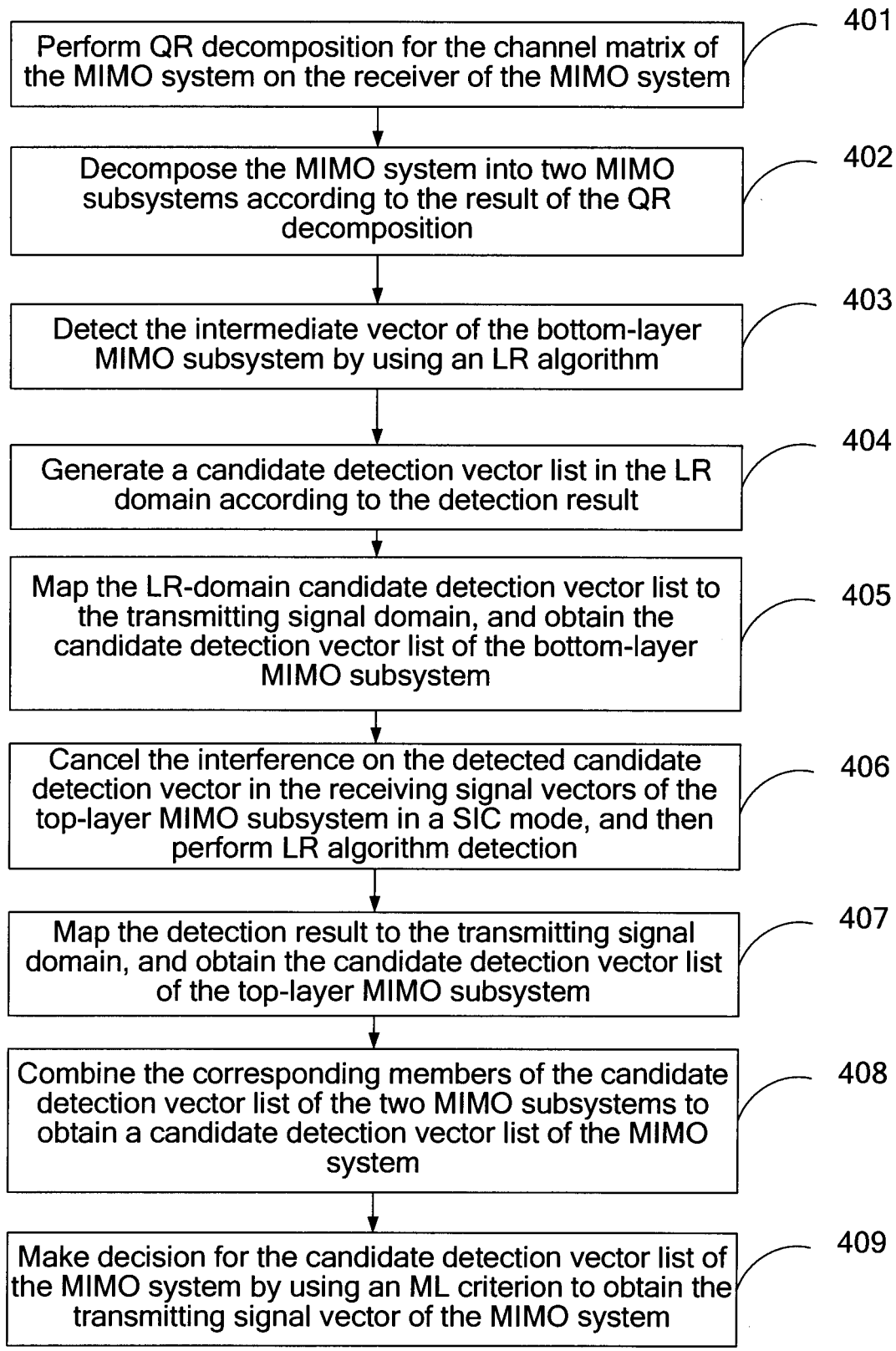
FIG. 4 is a flowchart of still another MIMO system signal detection method provided in an embodiment of the present invention.

In this embodiment, a MIMO system may be detected through many algorithms, including but not limited to LR algorithm. As shown in FIG. 4, another MIMO system signal detection method is provided in an embodiment of the present invention. In the system model in formula (5), it is assumed that the LR algorithm is applied in the detection and the candidate detection vector list of the MIMO system is decided. The method includes the following steps:

401: Perform QR decomposition on the channel matrix H of the MIMO system on the receiver side of the system. That is, decompose H into H=QR, where Q is a unitary matrix and R is an upper triangular matrix.

According to the decomposition result and the foregoing equation (5), the following intermediate vector x is obtained:

$$x = Q^H r = Rs + Q^H n \qquad (6)$$

Through QR decomposition, the channel matrix H is triangularized. In this embodiment, the QR decomposition maximizes the receiving signal-to-noise ratio of the bottom-layer MIMO subsystem. The QR decomposition may be implemented in many methods, including but not limited to Sorted QR Decomposition (SQRD). The SQRD method simplifies the LLL-Reduction calculation in the detection based on an LR algorithm, and improves the detection performance.

TABLE 1

| MIMO subsystem | Candidate detection vector list | | | | | | | | | | | | | |
| --- | --- | --- | --- | --- | --- | --- | --- | --- | --- | --- | --- | --- | --- | --- |
| Third | Q31 | Q32 | Q33 | Q34 | Q35 | Q36 | Q37 | Q38 | Q39 | Q40 | Q41 | Q42 | Q43 | Q44 |
| Second | | Q21 | | Q22 | | Q23 | | Q24 | | Q25 | | Q26 | | Q27 |
| First | | | Q11 | | | | | Q12 | | | | | Q13 | |

205: Make decision for the candidate detection vector list of the MIMO system to obtain the transmitting signal vector of the MIMO system.

Figure 3:
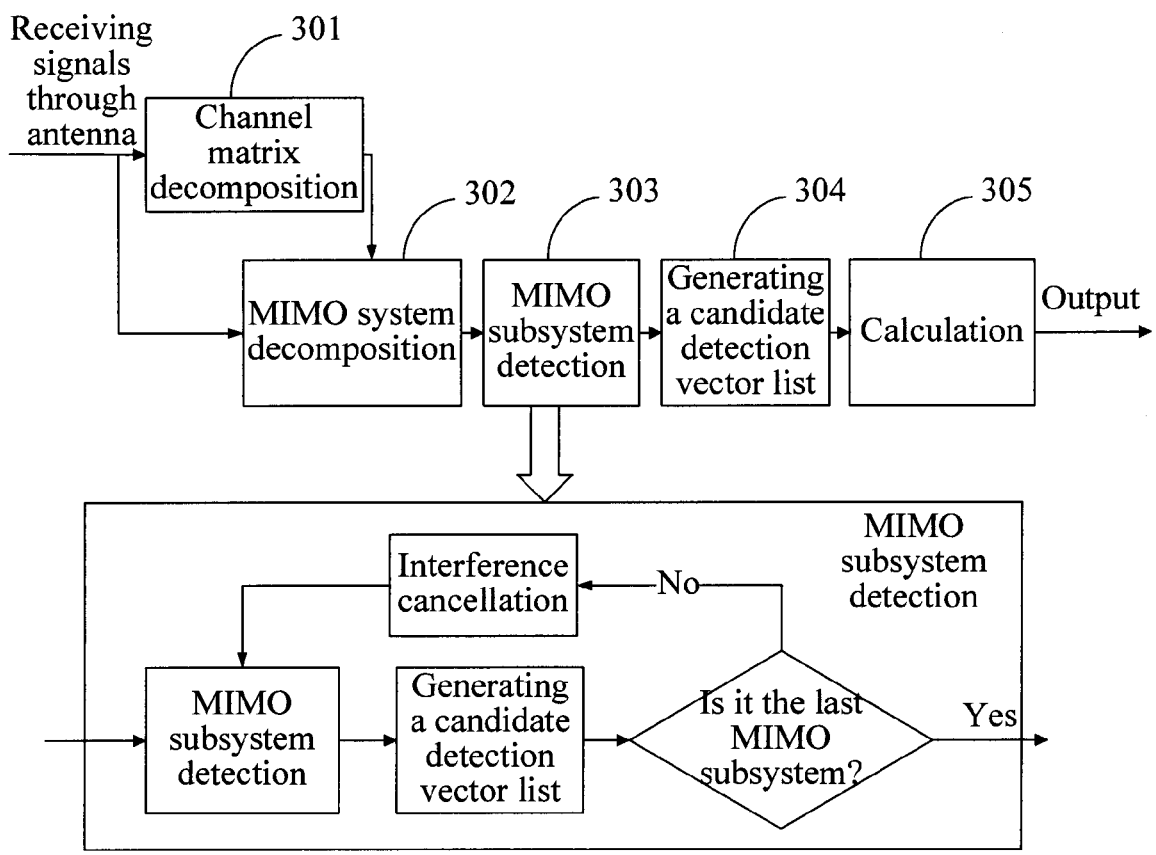
FIG. 3 is a flowchart of another MIMO system signal detection method provided in an embodiment of the present invention.

In the embodiment shown in FIG. 2, the step of deciding the MIMO system may be replaced with a calculation step. As shown in FIG. 3, steps 301-304 are the same as steps 201-204; step 305 is: Calculate the Logarithmic Likelihood Ratio (LLR) of the candidate detection vector list of the MIMO system to obtain the transmitting signal vector of the MIMO system. In this case, the obtained transmitting signal vector is generally output to a decoder.

In this embodiment, a MIMO system is divided into multiple MIMO subsystems, and detection is performed in the SIC mode. Because a MIMO subsystem has few basis vectors, LLL-Reduction calculation is not complex, and the LR algorithm is simplified drastically. Through the candidate detection vector lists, the probability of propagation errors is reduced if the LR algorithm performs SIC detection. The

402: Decompose the foregoing MIMO system into the following two MIMO subsystems according to the result of the QR decomposition:

$$\begin{bmatrix} x_1 \\ x_2 \end{bmatrix} = \begin{bmatrix} R_1 & R_2 \\ 0 & R_3 \end{bmatrix} \begin{bmatrix} s_1 \\ s_2 \end{bmatrix} + \begin{bmatrix} n_1 \\ n_2 \end{bmatrix} \qquad (7)$$

In equation (7), $x_i$ is the i th $N_i \times 1$ sub-vector of x, $n_i$ is the i th $N_i \times 1$ sub-vector of n, and $s_i$ is the i th $K_i \times 1$ sub-vector of s, where i is an ordinal number, $i \in 1,2$, $K_1 + K_2 = K$, and $N_1 + N_2 = N$.

Equation (7) reveals that after QR decomposition, the detection of the foregoing MIMO system may be decomposed into: solving $s_2$ for the first (bottom-layer) MIMO subsystem $x_2 = R_3 s_2 + n_2$ according to $x_2$, and then canceling the interference caused by $s_2$ onto the second (top-layer) MIMO subsystem $x_1 = R_1 s_1 + R_2 s_2 + n_1$ in $x_2$, and finally, detecting $s_1$.

403: Detect the intermediate vector $x_2$ of the bottom-layer MIMO subsystem by using an LR algorithm. The detection result is:

$$\tilde{c}_2 = LRDet(x_2) \qquad (8)$$

In equation (8), $\tilde{c}_2$ is a result obtained after detection is performed in the LR domain through an LR algorithm, and LRDet represents LR detection.

404: Generate a candidate detection vector list in the LR domain according to the detection result. $Q(1 \leq Q \leq M^{K_2})$ vectors closest to $\tilde{c}_2$ in the LR domain are represented by $C_2 = \text{List}(\tilde{c}_2)$.

The candidate detection vector list of the LR domain may be generated in many methods, including but not limited to the following method:

Select multiple LR domain vectors to form an LR-domain candidate detection vector list of the bottom-layer MIMO subsystem, where the distance between the vectors and the lattice of the detection result $\tilde{c}_2$ obtained through the LR algorithm is less than a preset value. The number of vectors in the LR-domain candidate detection vector list of the bottom-layer MIMO subsystem (namely, the length of the list) may be preset according to the target detection performance of the system. The distance between each of the multiple vectors and the lattice of the detection result may be a Mahalanobis distance. The preset value may be the minimum radius of a Voronoi space that can accommodate the possible number of vectors in the LR-domain candidate detection vector list.

405: Map the LR-domain candidate detection vector list $C_2$ to the transmitting signal domain of the MIMO system, and obtain the candidate detection vector list: $S_2 = \{\tilde{s}_2^{(1)}, \tilde{s}_2^{(2)}, \ldots, \tilde{s}_2^{(Q)}\}$ of the bottom-layer MIMO subsystem.

406: Detect the top-layer MIMO subsystem in a SIC mode. In the receiving signal vector $x_1$ of the top-layer MIMO subsystem, cancel the interference onto the top-layer MIMO subsystem by using each candidate detection vector in the candidate detection vector list $S_2$ of the detected bottom-layer MIMO subsystem, and detect the result of interference cancellation by using an LR algorithm. The result is:

$$\tilde{c}_1^q = LRDet(x_1 - R_2 \tilde{s}_2^{(q)}) \qquad (9)$$

In equation (9), $q=1, \ldots, Q$.

407: Map the obtained $\tilde{c}_1^q$ from the LR domain to the transmitting signal domain to obtain $\tilde{s}_1^{(q)}$ to obtain a candidate detection vector list $S_1 = \{\tilde{s}_1^{(1)}, \tilde{s}_1^{(2)}, \ldots, \tilde{s}_1^{(Q)}\}$ of the top-layer MIMO subsystem.

408: Combine the corresponding members of the candidate detection vector lists $S_1$ and $S_2$ of the two obtained MIMO subsystems, namely, $$\tilde{s}^{(q)} = \begin{bmatrix} \tilde{s}_1^{(q)} \\ \tilde{s}_2^{(q)} \end{bmatrix},$$

and obtain a candidate detection vector list $s = \{\tilde{s}^{(1)}, \tilde{s}^{(2)}, \ldots, \tilde{s}^{(Q)}\}$ of the MIMO system.

409: Make decision for the obtained candidate detection vector list $s$ of the MIMO system by using an ML criterion, and obtain the transmitting signal vector $\tilde{s}$ of the MIMO system.

$$\tilde{s} = \underset{q=1,2,\ldots,Q}{\arg\min} \|x - R\tilde{s}^{(q)}\|^2 \qquad (10)$$

In this embodiment, the intermediate vector of the bottom-layer MIMO subsystem may be detected through the LR algorithm in many methods in step 403, and the result of interference cancellation may be detected through the LR algorithm in many methods in step 406, and the detection methods include, but without being limited to, the following method:

Perform reduction operation on the channel matrix of the MIMO system by using a reduction algorithm to obtain a reduction unimodular matrix and a lattice-based reduction channel matrix; and detect the vector in the LR domain according to the reduction unimodular matrix and the lattice-based reduction channel matrix. The reduction algorithm may be an LLL-Reduction algorithm, and the LLL-Reduction algorithm may be a real-number LLL-Reduction algorithm or a complex LLL-Reduction algorithm. The algorithms used for the detection in the LR domain include but are not limited to: zero forcing algorithm, MMSE algorithm, SIC-based zero forcing algorithm, or SIC-based MMSE algorithm.

It is assumed that a MIMO subsystem obtained after the MIMO system in equation (5) undergoes QR decomposition is:

$$X = RS + v \qquad (11)$$

In equation (11), R is a channel matrix, $S \in s^{K_i}$ is a transmitting signal vector, $K_i$ is the number of dimensions of the transmitting vector of the MIMO subsystem, v is zero mean value Guassian noise $E[vv^H] = N_0 I$, where $N_0$ is noise power, I is a identity matrix, and H indicates conjugate transposition.

Taking the MIMO system in equation (11) as an example, the process of the LR algorithm is described below:

(1) Perform reduction operation on the channel matrix R by using a reduction algorithm to obtain a reduction unimodular matrix U and a lattice-based reduction channel matrix $\overline{R} = RU$.

(2) Perform linear transformation on the receiving signal vector X to transform the receiving signal vector into a complex integer. Supposing that an M-QAM modulation mode is applied and the modulation order is m, perform scaling and shifting operations on the receiving signal vector X:

$$d = \alpha X + \beta R1 = R(\alpha S + \beta 1) + \alpha v = Rb + \alpha v \qquad (12)$$

In equation (12), $\alpha$ is a scaling coefficient and $\beta$ is a shifting coefficient; $1 = [1\ 1\ \ldots\ 1]^T$, $\alpha = \frac{1}{2}A$, $\beta = (3A/2)(1+j)$, $$A = \sqrt{\frac{3E_s}{2(M-1)}},$$

$E_s = E[|s|^2]$ is symbol energy, $M = 2^{2m}$, and $b = \alpha S + \beta 1 \in C^{K_i}$.

Let $c = U^{-1}b$, and the MIMO system model in equation (12) changes to:

$$d = RUU^{-1}b + \alpha v = \overline{R}c + \alpha v \qquad (13)$$

(3) Detect c in the LR domain, for example, through an MMSE algorithm. The obtained estimate value is $\tilde{c} = (\overline{R}^H \overline{R} + \alpha^2 N_0)^{-1} \overline{R}^H d$.

In step 404, the detailed process of generating a candidate detection vector list of the LR domain may be as follows (taking the MIMO system in equation (13) as an example):

According to the ML criterion, the solution to c should be arg min$\|d - \overline{R}b\|$. $\|d - \overline{R}b\| = \|d - \overline{R}c\|$ and $d \approx \overline{A}\tilde{c}$, and therefore, $$\|d - \overline{R}c\| \approx \|\overline{R}\tilde{c} - \overline{R}c\| = \|\tilde{c} - c\|_{\overline{R}^H \overline{R}} \qquad (14)$$

$\|x\|_A = \sqrt{x^H A x}$ is called Mahalanobis distance, namely, the distance between the vector and the lattice of $\tilde{c}$. Therefore, the candidate detection vector list of the LR domain is:

$$C_{candidate} = \{c_c \mid \|\tilde{c} - c\|_{\overline{R}^H \overline{R}} < r_{\overline{R}}(Q)\} \qquad (15)$$

In equation (15), $r_{\bar{R}}(Q)>0$, which is a radius of a Voronoi space that uses č as a center and includes Q elements. This radius may be calculated in many methods, for example, $$r_{\bar{R}}^{2}(Q) = \frac{(QV(\bar{R})K!)^{\frac{1}{K}}}{\pi},$$

where $V(\bar{R})$ is the volume of the Voronoi space, and $2K$ is the number of dimensions of the Voronoi space, which are covered by the prior art and are not repeated here any further.

In this embodiment, a MIMO system is divided into multiple MIMO subsystems, and detection is performed in the SIC mode. Because a MIMO subsystem has few basis vectors, LLL-Reduction calculation is not complex, and the LR algorithm is simplified drastically. Moreover, the system performance is close to the performance achieved through the ML algorithm, namely, less than 1 dB. Through the candidate detection vector lists, the probability of error propagation is reduced if the LR algorithm performs SIC detection. The MIMO system detection is simplified drastically if the system performance approaches the ML algorithm. The detection performed in the SIC mode and based on the LR algorithm further improves the detection performance of the system, and improves the detection precision as against the prior art. The candidate vector list is generated in a Mahalanobis distance mode. Compared with the Euclidean distance approach in the prior art, the Mahalanobis distance mode is easier to implement, and further reduces the complexity of the LR algorithm.

Figure 5:
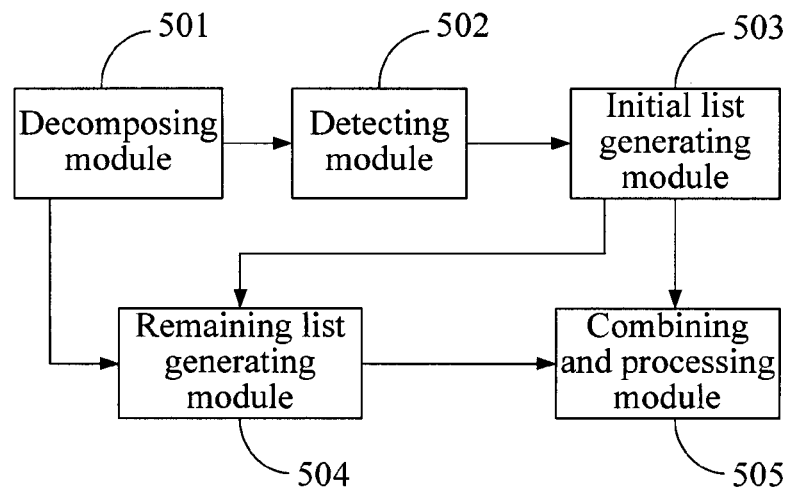
FIG. 5 shows a structure of a MIMO system signal detection apparatus provided in an embodiment of the present invention.

As shown in FIG. 5, a MIMO system signal detection apparatus provided in an embodiment of the present invention includes:

a decomposing module 501, configured to: perform triangular decomposition on a channel matrix of a MIMO system, and decompose the MIMO system into multiple MIMO subsystems;

a detecting module 502, configured to: detect a receiving signal vector of a first MIMO subsystem among the multiple MIMO subsystems;

an initial list generating module 503, configured to: generate a candidate detection vector list of the first MIMO subsystem according to a detection result of the detecting module 502;

a remaining list generating module 504, configured to: detect remaining MIMO subsystems consecutively in a SIC mode, and generate candidate detection vector lists of the remaining MIMO subsystems; and a combining and processing module 505, configured to: combine corresponding members of the obtained candidate detection vector lists of all MIMO subsystems to obtain a candidate detection vector list of the MIMO system; and make decision for or perform calculation on the candidate detection vector list of the MIMO system to obtain a transmitting signal vector of the MIMO system.

Figure 6:
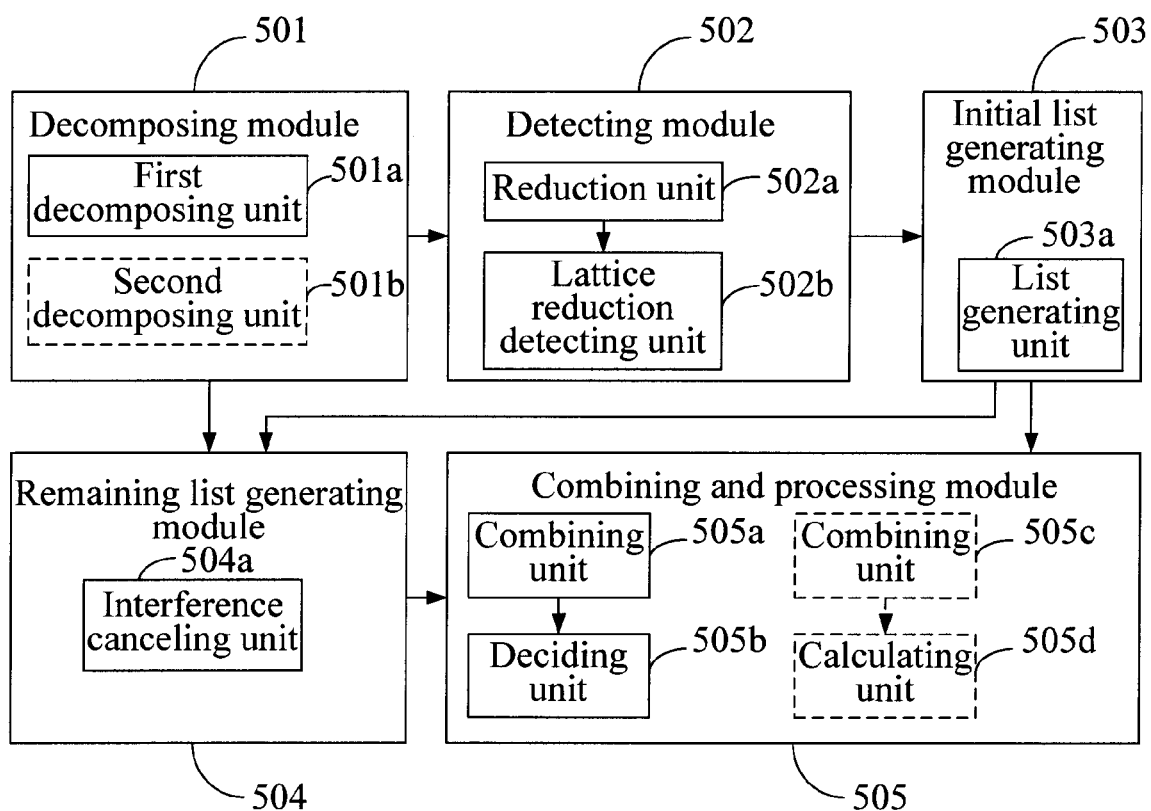
FIG. 6 shows another structure of a MIMO system signal detection apparatus provided in an embodiment of the present invention.

As shown in FIG. 6, the decomposing module 501 includes:

a first decomposing unit 501a, configured to: perform triangular decomposition on the channel matrix of the MIMO system to obtain an upper triangular matrix, and decompose detection of a MIMO system into detection of multiple MIMO subsystems, where the first MIMO subsystem is a bottom-layer MIMO subsystem.

Alternatively, the decomposing module 501 includes:

a second decomposing unit 501b, configured to: perform triangular decomposition on the channel matrix of the MIMO system to obtain a lower triangular matrix, and decompose detection of a MIMO system into detection of multiple MIMO subsystems, where the first MIMO subsystem is a top-layer MIMO subsystem.

As shown in FIG. 6, the detecting module 502 may include:

a reduction unit 502a, configured to perform reduction operation on the channel matrix by using a reduction algorithm to obtain a reduction unimodular matrix and a lattice-based reduction channel matrix; and a lattice reduction detecting unit 502b, configured to: detect the receiving signal vector of the first MIMO subsystem among multiple MIMO subsystems in the LR domain according to the reduction unimodular matrix and the lattice-based reduction channel matrix obtained by the reduction unit 502a, and obtain the LR domain detection result of the first MIMO subsystem.

As shown in FIG. 6, the initial list generating module 503 may include:

a list generating unit 503a, configured to: select multiple vectors to form a candidate detection vector list of the first MIMO subsystem according to the detection result of the detecting module, where the distance between the vectors and the lattice of the detection result is less than a preset value.

As shown in FIG. 6, the remaining list generating module 504 may include:

an interference canceling unit 504a, configured to: starting from the second MIMO subsystem, detect the remaining MIMO subsystems consecutively in a SIC mode; in the receiving signal vectors of the current MIMO subsystem, cancel the interference on the current MIMO subsystem by using each candidate detection vector in the candidate detection vector lists of all detected MIMO subsystems; detect the results of interference cancellation respectively to obtain a candidate detection vector list of the current MIMO subsystem, repeat the process of detecting, canceling and detecting results until the candidate detection vector list of the last MIMO subsystem is obtained.

As shown in FIG. 6, the combining and processing module 505 may include:

a combining unit 505a, configured to: combine the corresponding members of the candidate detection vector list of all obtained MIMO subsystems to obtain a candidate detection vector list of the MIMO system;

a deciding unit 505b, configured to: make decision for the candidate detection vector list of the MIMO system by using an ML criterion, which is obtained by the combining unit 505a; and obtain the transmitting signal vector of the MIMO system.

Alternatively, the combining and processing module 505 includes:

a combining unit 505c, configured to: combine the corresponding members of the candidate detection vector list of all obtained MIMO subsystems to obtain a candidate detection vector list of the MIMO system;

a calculating unit 505d, configured to: calculate the LLR of the candidate detection vector list of the MIMO system to obtain the transmitting signal vector of the MIMO system.

The MIMO system signal detection apparatus provided in this embodiment is applicable in a receiver of the MIMO system.

In this embodiment, a MIMO system is divided into multiple MIMO subsystems, and detection is performed in the SIC mode. Because a MIMO subsystem has few basis vectors, LLL-Reduction calculation is not complex, and the LR algorithm is simplified drastically. Moreover, the system performance is close to the performance achieved through the ML algorithm, namely, less than 1 dB. Through the candidate detection vector lists, the probability of error propagation is reduced if the LR algorithm performs SIC detection. The MIMO system detection is still simplified drastically if the system performance approaches the ML algorithm. The detection performed in the SIC mode and based on the LR algorithm further improves the detection performance of the system, and improves the detection precision as against the prior art. The candidate vector list is generated in a Mahalanobis distance mode. Compared with the Euclidean distance mode in the prior art, the Mahalanobis distance mode is easier to implement, and further reduces the complexity of the LR algorithm.

Table 2 gives comparison between the complexity of the LR+List algorithm and the complexity of the MMSE algorithm in an embodiment of the present invention. It reveals that the complexity of the LR+List algorithm and the complexity of the MMSE algorithm are of the same magnitude, and are far less than the complexity of the ML algorithm, and provide a system performance close to the system performance brought by the ML algorithm.

TABLE 2

| Detection algorithm | 4-QAM | 16-QAM | 64QAM | Q = 8 | Q = 12 |
| --- | --- | --- | --- | --- | --- |
| MMSE algorithm | 160 | 160 | 160 | — | — |
| ML algorithm | 4096 | 1048576 | 268435456 | — | — |
| Present invention | — | — | — | 262 | 326 |

Figure 7:
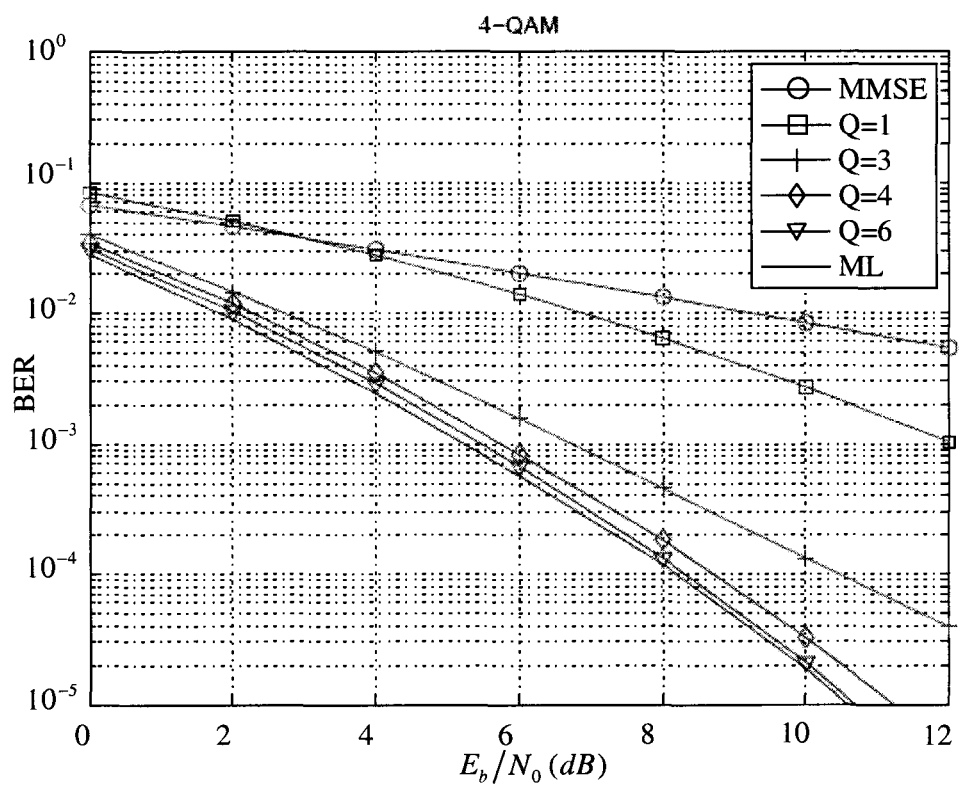
FIG. 7 shows a performance simulation result of detecting a 4×4 MIMO system through an MMSE algorithm, an ML algorithm and an LR+List algorithm respectively in the case of 4-Quadrature Amplitude Modulation (4QAM) in an embodiment of the present invention.
Figure 8:
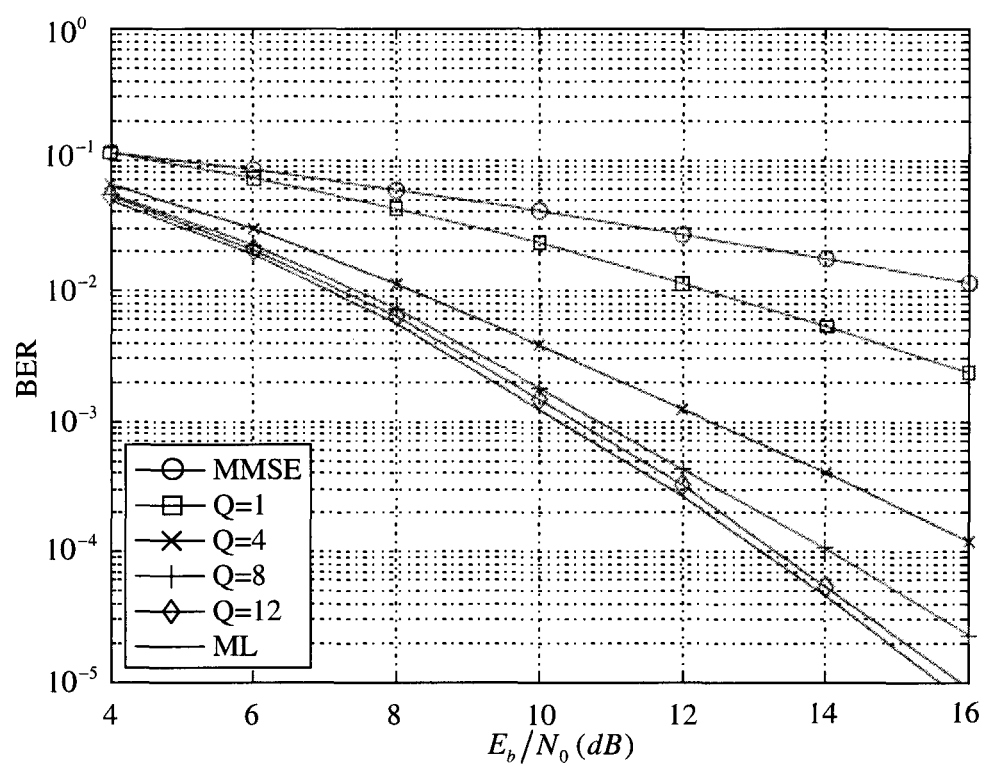
FIG. 8 shows a performance simulation result of detecting a 4×4 MIMO system through an MMSE algorithm, an ML algorithm and an LR+List algorithm respectively in the case of 16QAM in an embodiment of the present invention.

FIG. 7 and FIG. 8 give performance emulation results of applying the MMSE algorithm, the ML algorithm, and the LR+List algorithm put forward herein respectively in a 4×4 MIMO system in the case of 4QAM modulation and 16QAM modulation if the candidate list comes in different sizes. It is evident that the performance of the LR+List algorithm is close to the performance of the ML algorithm, namely, less than 1 dB, if a proper Q is selected.

Persons of ordinary skill in the art should understand that all or a part of the steps of the method according to the embodiments of the present invention may be implemented by a program instructing relevant hardware. The program may be stored in a computer readable storage medium. The storage medium may be any medium that is capable of storing program codes, such as a ROM, RAM, magnetic disk, or CD-ROM.

Although the invention has been described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for detecting signals of a Multi-Input Multi-Output (MIMO) system, comprising:
    performing triangular decomposition on a channel matrix of the MIMO system;
    decomposing the MIMO system into multiple MIMO subsystems;
    detecting a receiving signal vector of a first MIMO subsystem among the multiple MIMO subsystems, wherein said detecting the receiving signal vector of the first MIMO subsystem among the multiple MIMO subsystems comprises:
        performing a reduction operation on the channel matrix by using a reduction algorithm to obtain a reduction unimodular matrix and a lattice-based reduction channel matrix; and
        detecting the receiving signal vector of the first MIMO subsystem among the multiple MIMO subsystems in a Lattice Reduction (LR) domain according to the reduction unimodular matrix and the lattice-based reduction channel matrix to obtain an LR domain detection result of the first MIMO subsystem;
    generating a candidate detection vector list of the first MIMO subsystem according to the detection result, wherein generating the candidate detection vector list of the first MIMO subsystem according to the detection result comprises selecting multiple vectors to form the candidate detection vector list of the first MIMO subsystem according to the detection result, wherein a distance between each of the multiple vectors and a lattice of the detection result is less than a preset value;
    detecting remaining MIMO subsystems consecutively in a Successive Interference Cancellation (SIC) mode;
    generating candidate detection vector lists of the remaining MIMO subsystems;
    combining corresponding members of the generated candidate detection vector lists of all MIMO subsystems to obtain a candidate detection vector list of the MIMO system; and
    making a decision for or performing a calculation on the candidate detection vector list of the MIMO system to obtain a transmitting signal vector of the MIMO system.

2. The method for detecting signals of a MIMO system according to claim 1, wherein: detecting the remaining MIMO subsystems consecutively in the SIC mode and generating the candidate detection vector lists of the remaining MIMO subsystems comprises:
    starting from a second MIMO subsystem, detecting the remaining MIMO subsystems;
    among receiving signal vectors of a currently detected MIMO subsystem, canceling interference on the currently detected MIMO subsystem by using each candidate detection vector in the candidate detection vector lists of all detected MIMO subsystems;
    detecting results of interference cancellation respectively to obtain the candidate detection vector list of the currently detected MIMO subsystem; and
    repeating the process of detecting, canceling and detecting results until the candidate detection vector list of the last MIMO subsystem is obtained.

3. The method for detecting signals of a MIMO system according to claim 2, wherein:
    detecting the results of interference cancellation respectively includes:
        detecting the results of interference cancellation respectively by using an LR algorithm.

4. The method for detecting signals of a MIMO system according to claim 1, wherein:
    the triangular decomposition comprises Sorted Quadrature Rectangular Decomposition (SQRD).

5. The method for detecting signals of a MIMO system according to claim 2, wherein: detecting results of interference cancellation respectively comprises:
    performing reduction operation on the channel matrix by using a reduction algorithm to obtain a reduction unimodular matrix and a lattice-based reduction channel matrix; and detecting the results of interference cancellation in an LR domain respectively according to the reduction unimodular matrix and the lattice-based reduction channel matrix.

6. The method for detecting signals of a MIMO system according to claim 1, wherein:
the distance between each of the multiple vectors and the lattice of the detection result is Mahalanobis distance.

7. The method for detecting signals of a MIMO system according to claim 1, wherein:
the preset value is a minimum radius of a Voronoi space that can accommodate the number of vectors in the candidate detection vector list.

8. The method for detecting signals of a MIMO system according to claim 1, wherein:
a Maximum-Likelihood (ML) criterion is adopted to make decision for the candidate detection vector list of the MIMO system.

9. The method for detecting signals of a MIMO system according to claim 1, wherein: performing calculation on the candidate detection vector list of the MIMO system to obtain the transmitting signal vector of the MIMO system comprises:
calculating a Logarithmic Likelihood Ratio (LLR) of the candidate detection vector list of the MIMO system to obtain the transmitting signal vector of the MIMO system.

10. A detector located in a receiver which receives data, the detector configured to detect signals of a Multi-Input Multi-Output (MIMO) system, the detector comprising:
a decomposing module, configured to perform triangular decomposition on a channel matrix of the MIMO system, and decompose the MIMO system into multiple MIMO subsystems;
a detecting module, configured to detect a receiving signal vector of a first MIMO subsystem among the multiple MIMO subsystems, wherein the detecting module comprises:
a reduction unit, configured to perform a reduction operation on the channel matrix by using a reduction algorithm to obtain a reduction unimodular matrix and a lattice-based reduction channel matrix; and
a lattice reduction detecting unit, configured to detect the receiving signal vector of the first MIMO subsystem among the multiple MIMO subsystems in a Lattice Reduction (LR) domain according to the reduction unimodular matrix and the lattice-based reduction channel matrix obtained by the reduction unit so as to obtain an LR domain detection result of the first MIMO subsystem;
an initial list generating module, configured to generate a candidate detection vector list of the first MIMO subsystem according to the detection result of the detecting module, wherein the initial list generating module comprises a list generating unit, configured to select multiple vectors to form the candidate detection vector list of the first MIMO subsystem according to the detection result of the detecting module, wherein a distance between each of the multiple vectors and a lattice of the detection result is less than a preset value;
a remaining list generating module, configured to detect remaining MIMO subsystems consecutively in a Successive Interference Cancellation (SIC) mode, and generate candidate detection vector lists of the remaining MIMO subsystems; and
a combining and processing module, configured to combine corresponding members of the generated candidate detection vector lists of all MIMO subsystems to obtain a candidate detection vector list of the MIMO system, and make decision for or perform calculation on the candidate detection vector list of the MIMO system to obtain a transmitting signal vector of the MIMO system.

11. The detector according to claim 10, wherein the decomposing module comprises:
a first decomposing unit, configured to perform triangular decomposition on the channel matrix of the MIMO system to obtain an upper triangular matrix, and decompose detection of a MIMO system into detection of multiple MIMO subsystems, wherein the first MIMO subsystem is a bottom-layer MIMO subsystem.

12. The detector according to claim 10, wherein the decomposing module comprises:
a second decomposing unit, configured to perform triangular decomposition on the channel matrix of the MIMO system to obtain a lower triangular matrix, and decompose detection of a MIMO system into detection of multiple MIMO subsystems, wherein the first MIMO subsystem is a top-layer MIMO subsystem.

13. The detector according to claim 10, wherein the remaining list generating module comprises:
an interference canceling unit, configured to starting from a second MIMO subsystem, detect the remaining MIMO subsystems; among receiving signal vectors of a currently detected MIMO subsystem, cancel interference on the currently detected MIMO subsystem by using each candidate detection vector in the candidate detection vector lists of all detected MIMO subsystems;
detect results of interference cancellation respectively to obtain the candidate detection vector list of the currently detected MIMO subsystem, and repeat the process of detecting, canceling and detecting results until the candidate detection vector list of the last MIMO subsystem is obtained.

14. The detector according to claim 10, wherein the combining and processing module comprises:
a combining unit, configured to combine corresponding members of the candidate detection vector list of all obtained MIMO subsystems to obtain a candidate detection vector list of the MIMO system; and
a deciding unit, configured to make decision for the candidate detection vector list of the MIMO system, which is obtained by the combining unit, by using a Maximum-Likelihood (ML) criterion to obtain the transmitting signal vector of the MIMO system.

15. The detector according to claim 10, wherein the combining and processing module comprises:
a combining unit, configured to combine corresponding members of the candidate detection vector list of all obtained MIMO subsystems to obtain a candidate detection vector list of the MIMO system; and
a calculating unit, configured to calculate a Logarithmic Likelihood Ratio (LLR) of the candidate detection vector list of the MIMO system to obtain the transmitting signal vector of the MIMO system.

* * * * *